United States Patent [19]
McGill

[11] Patent Number: 5,150,820
[45] Date of Patent: Sep. 29, 1992

[54] DISPENSING APPARATUS FOR FROZEN PRODUCT

[76] Inventor: Shane R. McGill, 3 Parrs Head Mews, George Lane, Rochester, Kent, England

[21] Appl. No.: 556,333

[30] Foreign Application Priority Data

| Jul. 20, 1989 [GB] | United Kingdom | 8916579 |
| Aug. 24, 1989 [GB] | United Kingdom | 8919216 |
| Jan. 13, 1990 [GB] | United Kingdom | 9000792 |

[22] Filed: Jul. 20, 1990

[51] Int. Cl.⁵ ............................................. B65D 35/28
[52] U.S. Cl. ................................................ 222/95; 92/34; 92/44; 222/146.6; 222/326; 222/387; 222/389
[58] Field of Search ............... 222/95, 146.6, 214, 222/386, 389, 326, 387; 92/34, 44, 45

[56] References Cited

U.S. PATENT DOCUMENTS

| 4,169,548 | 10/1979 | Bond | 222/511 |
| 4,335,835 | 6/1982 | Bergler et al. | 222/263 X |
| 4,775,564 | 10/1988 | Shriver et al. | 222/95 X |
| 4,913,713 | 4/1990 | Bender et al. | 222/146.6 X |
| 4,921,135 | 5/1990 | Pleet | 222/146.6 X |
| 4,938,386 | 7/1990 | Roethel et al. | 222/92 |
| 5,060,826 | 10/1991 | Coleman | 222/386.5 X |

FOREIGN PATENT DOCUMENTS

| 0448571 | 5/1948 | Canada | 92/45 |
| 0285709 | 6/1987 | European Pat. Off. | |
| 0314209 | 3/1988 | European Pat. Off. | |
| 1168470 | 1/1957 | France | 92/44 |
| 0378615 | 2/1940 | Italy | 92/45 |
| 1300386 | 12/1972 | United Kingdom | 222/389 |

Primary Examiner—Michael S. Huppert
Assistant Examiner—Joseph A. Kaufman
Attorney, Agent, or Firm—Gifford, Groh, Sprinkle, Patmore and Anderson

[57] ABSTRACT

Frozen product dispensing apparatus comprises a cylindrical housing 14 for locating a cylindrical deformable container 26 of product. A plunger 16 bears on the container to discharge the product from the container 26 and the plunger is driven by compressed air either by direct pressure on the plunger 16 or by the use of a bellows which engages on the plunger. The housing 14 has a door 22 through which the product passes to an outlet valve 29 and the door may be opened to replace the container 26.

9 Claims, 5 Drawing Sheets

DISPENSING APPARATUS FOR FROZEN PRODUCT

This invention relates to dispensing apparatus and in particular to apparatus for dispensing frozen material such as ice cream or other frozen, semi-frozen or chilled confectionery.

It has been proposed to dispense ice cream and other products from deformable or collapsible containers but the container and the means for deforming the container have limited the application of the dispensing means, particularly in terms of the product which can be dispensed, the size of the apparatus, the power requirements and the need to meet strict hygiene requirements.

An object of the invention is to provide dispensing apparatus which is capable of dispensing a wide range of frozen material and which is of relatively simple construction.

According to one aspect of the invention dispensing apparatus for dispensing a frozen product comprises deformable container means for containing a frozen product in semi-solid form to be dispensed, the container means having outlet means including an outlet opening in one end of the container means through which the product is discharged; drive means for deforming the container means whereby to discharge product in the container means through the outlet opening, the drive means being power operated and including a plunger engageable with the opposite end of the container means to the outlet opening to cause incremental quantities of product to be discharged through the opening by progressive deformation of the container means; a housing or compartment for receiving the container means, the housing serving to releasably secure the container means during operation; and refrigeration means whereby the container means is kept at a low temperature, wherein the drive means includes a source of pressurised gas which is applied to act on the plunger during discharge of product from the container means so that the plunger acts in the manner of a piston movable along the housing in one discharge direction under the action of the drive means and in the opposite direction during insertion of a replacement pre-filled container means into the housing.

In one arrangement the pressurised gas acts directly on the plunger during discharge, the plunger being sealingly engageable with the internal walls of the housing.

Alternatively the drive means includes an extendable envelope located between the plunger and the end of the housing remote from the outlet means, the envelope communicating with the source of pressurised gas to extend and urge the plunger against said opposite end of the container means during admission of said gas.

Preferably the extendable envelope comprises bellows means located between and engageable with the plunger and the housing, the radially outer periphery of the bellows means being non-engageable with the side walls of the housing.

The bellows means may have a stroke upon full extension at least equal to the difference between the length of a full container means and the length of the container means when fully deformed.

Conveniently the bellows means comprises interconnected flexible, annular discs, adjacent discs being connected alternately at their inner and outer diameters.

Preferably the housing is formed at one end with a door containing an opening for receiving the container outlet means, the door providing during discharge an abutment against which the container means is engaged and the door, when opened, providing access to the housing for replacement of the container means.

The door may be hingedly mounted on the housing and include securing means for securing the door to the housing during discharge of product.

The door may carry a shut-off valve means for controlling discharge of product through the outlet means, the valve means comprising nozzle means through which product is discharged.

For cleaning purposes the shut-off valve means may be releasable from the door means and the container outlet means may communicate directly with the valve means.

The refrigeration means may include coolant passages directly located around the housing to cool the housing and the housing may be enclosed by heat insulating means.

According to another aspect of the invention there is provided dispensing apparatus for dispensing a frozen product which comprises deformable container means for containing a frozen product in semi-solid form to be dispensed, the container means having outlet means including an outlet opening in one end of the container means through which the product is discharged; drive means for deforming the container means whereby to discharge product in the container means through the outlet opening, the drive means engaging with the end of the container means opposite to the outlet opening to cause the product to be discharged through the opening by deformation of the container means; a housing or compartment for receiving the container means, the housing serving to releasably secure the container means during operation; and refrigeration means whereby the container means is kept at a low temperature, wherein the housing has at one end a door defining an opening in the housing and by which door the container means is releasably located in the housing, the door receiving the container outlet means and the door carrying shut-off valve means for controlling discharge of product from the container means.

The container means may be of two part construction having one part comprising an end wall having the outlet means and the other part comprising a body which is secured to said one part after the container means is filled with product.

Further features of the invention will appear from the following description of embodiments of the invention given by way of example only and with reference to the drawings, in which.

Figure 1:
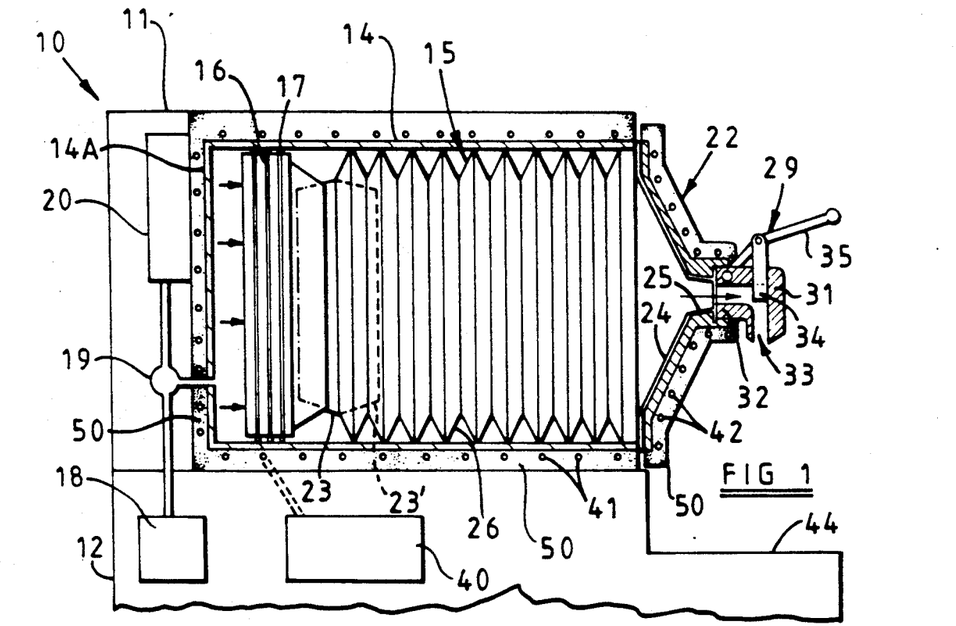
FIG. 1 is a side elevation, partly in section, of one form of dispensing apparatus.
Figure 2:
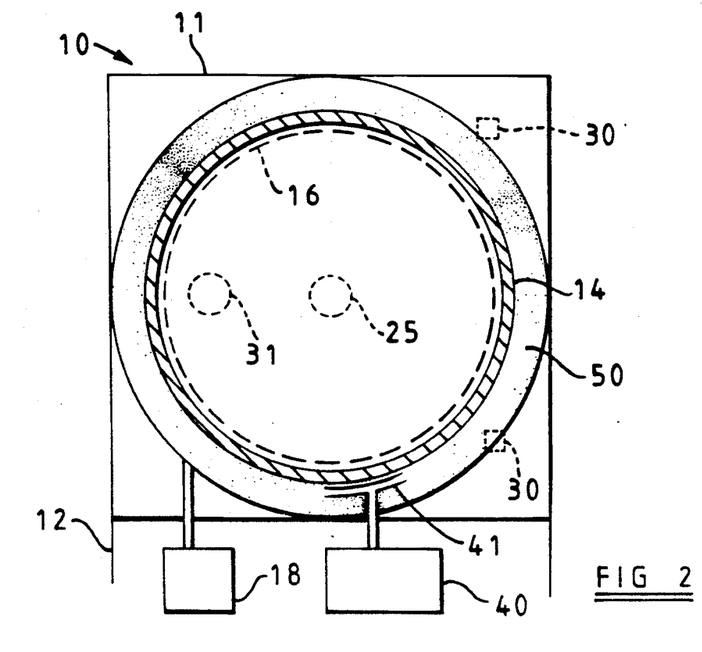
FIG. 2 is a vertical section through the apparatus of FIG. 1.
Figure 3:
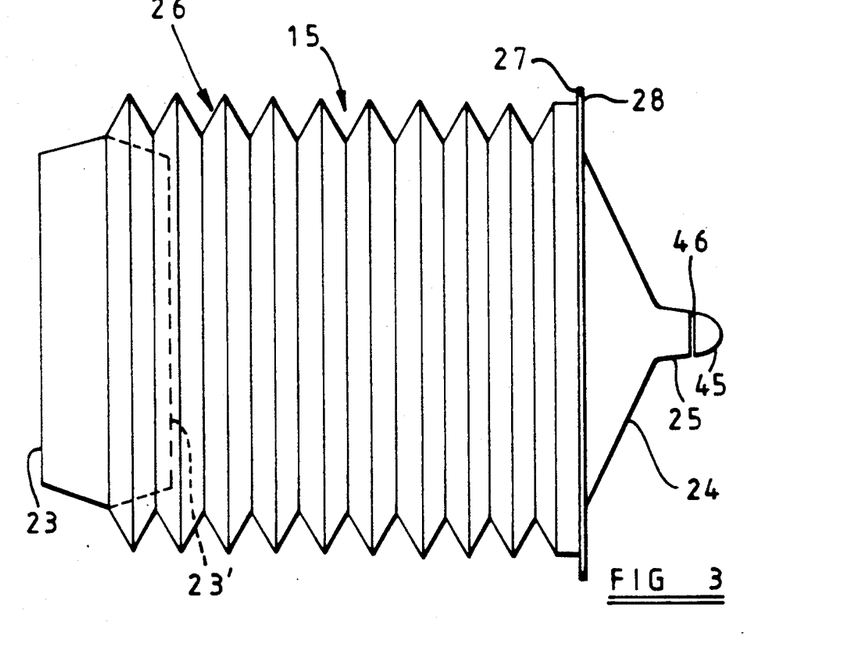
FIG. 3 is a side view of a container for use in the apparatus of FIGS. 1 and 2.

Referring to FIGS. 1-3 of the drawings dispensing apparatus 10 includes a rectangular body 11 and a base 12. Within the body 11 is located a cylindrical housing or compartment 14 for removably receiving a generally cylindrical container 15 of product to be dispensed. The housing 14 is closed at one end 14A and a plunger or piston 16 is reciprocally movable along the housing 14 from said one end 14A towards the opposite end.

The piston 16 is sealed against the inner wall of the housing 14 by seals 17 and is driven along the housing b compressed air from a compressor 18. The compressed air passes from the compressor through a valve 19 into the housing 14 or into a receiver 20, the valve 19 also operating to communicate with the receiver 20 according to the operating phase of the apparatus and the pressure within the housing 14.

Figure 11:
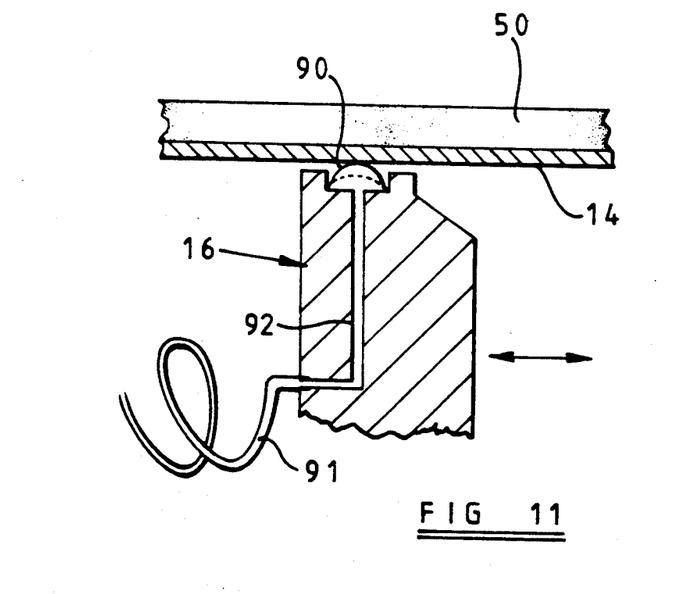
FIG. 11 is a scrap view showing one modified form of piston.

Because of the possibility of build up of ice on the internal walls of the housing 14 the seals 17 may be arranged to be flexibly located to accommodate such ice build up. Thus the seals may have a radial depth sufficient for this purpose. In one arrangement the seals 17 include an inflatable tubular member extending around the piston 16 to flexibly bridge the space between the piston periphery and the inner wall of the housing 14 as shown in FIG. 11. In this arrangement the inflatable tubular member is shown at 90 and extends wholly circumferentially around the piston 16. Air to the tubular member 90 is led along hose 91 into the piston, along a duct 92 in the piston to the member 90. Upon admission of air to the member 90 it expands outwards into sealing contact with the wall of the cylinder 14. The air pressure in the member 90 may be relatively small but still give adequate sealing contact with the cylinder wall and sealing when the wall is uneven or has a layer of ice.

At the end of the housing 14 remote from the piston 16 a door 22 is provided for securing the container 15 in the housing 14 and for providing an abutment against which the container 15 bears when engaged by the piston 16. Opening of the door 22 permits access into the housing 14 for changing and removing the container 15.

The container 15 (see FIG. 3) is of generally cylindrical shape having an end wall 23 at one end which is arranged to be engaged by the piston 16 and at the other end a generally conical end wall 24 at the apex of which is formed an outlet 25 through which product is discharged from the container. The outlet 25 is in the form of a tapered nozzle.

Between the end walls 23 and 24 the body 26 of the container is corrugated so that it may be deformed in its axial direction to reduce the internal volume of the container when the piston engages the end wall 23. Upon engagement of the piston 16 with the end wall 23 the end wall deforms to the position shown by chain lines 23'.

The door 22 conforms in its internal shape to the shape of the end wall 24 and at the centre of the door is located an opening for receiving the tapered outlet nozzle 25. The door 22 is in use of the apparatus secured to the housing 14.

The container is, in this case, formed in two parts, a body part consisting of the end wall 23 and the body 26 and a lid part consisting of the end wall 24 and its associated nozzle 25. The body part and the lid part are secured together after the body part is filled with product. For this purpose the body part is formed with a flange 27 which cooperates with a flange 28 on the lid part. After filling of the body part with product as, for example, by locating the body part under the filling apparatus (not shown) from which product is extruded into the container in a cylindrical block, the lid part is secured to the body part by welding the cooperating flanges 27 and 28 together. As seen the flanges 27, 28 may, after being secured together, extend radially beyond the cylindrical wall of the container in which case the flanges are located between the cylinder 14 and the door 22 when the door is closed.

The door 22 may have hinges 30 at one side or both sides (to open in either direction) and a handle 31 by which the door is opened and closed. Clamps (not shown) may also be provided for clamping the door in a closed position while a container is located in the cylinder for a dispensing operation.

Mounted releasably on the door 22 is a valve assembly 29 by which the discharge of product from the container is controlled. The assembly 29 includes a valve block 31 having a conduit 32 for receiving product directly from the nozzle 25. The conduit 32 leads to a discharge nozzle 33 which is downwardly directed to discharge into a container into which the product is to be dispensed. A reciprocable valve member 34 (shown in FIG. 1 in an open position) is movable up and down to act as a shut-off valve in the discharge nozzle 33. The valve member 34 may be operated by a pneumatically operated piston and cylinder or manually by the handle 35.

Upon the valve 29 being operated to the open position the air valve 19 is operated to introduce compressed air from the compressor 18 and/or the receiver 20 to cause the piston 16 to be urged against the container 15.

At the end of a full stroke of the piston 16 in the housing 14 the air pressure behind the container is released. The door 22 is opened to gain access to the container 15 and the container, now empty, is removed from the cylinder 14. Another full container is inserted into the cylinder and as this takes place the piston 16 is pushed back along the cylinder to its start position. After full insertion of a full container the door is closed and fixed in position by closing the door 22 and operating the clamps.

Figures 8, 9, 10:
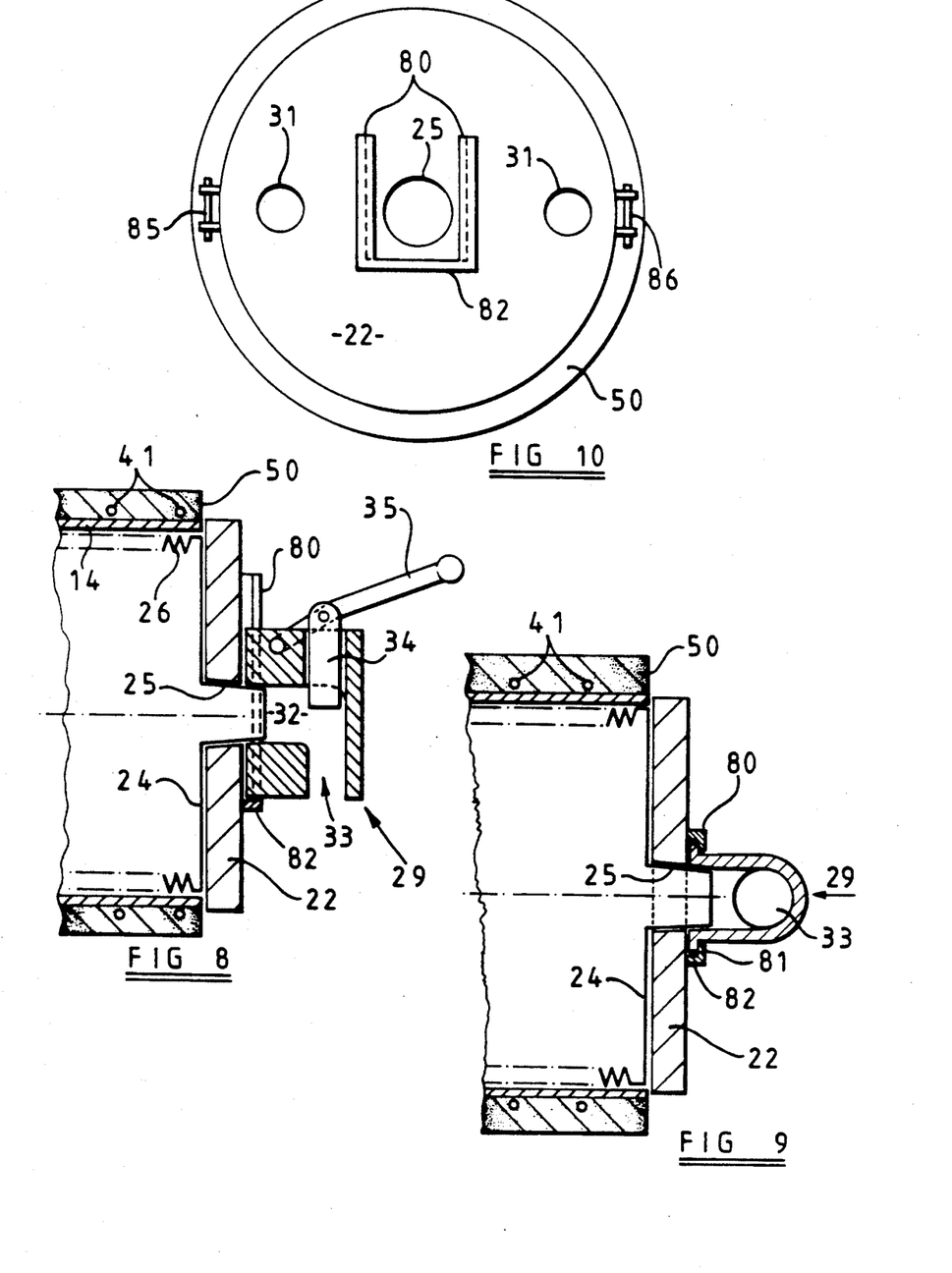
FIG. 8 is a vertical section through part of an alternative form of the apparatus of FIG. 4.
FIG. 9 is a horizontal section of the part shown in FIG. 8.
FIG. 10 is an end view of the part of FIGS. 8 and 9 with the valve assembly omitted.

The valve assembly may be released from the door 22 for cleaning by, for example, using a bayonet or slide fitting between the door and the assembly (see FIGS. 8 and 9).

The base 13 of the apparatus contains refrigeration means 40 which is arranged to keep the housing 14 at a low temperature by supplying coolant which is passed around the outer surface of the housing 14 through conduits 41 extending around said surface. Further conduits 42 extend around the door 22 and the coolant passing around the conduits 41 and 42 keeps the housing 14 at the desired low temperature for the product therein to be kept frozen. Alternatively the door 22 and/or the cylinder 14 may have coolant passages formed internally. The conduits 41 and 42 and the end wall 14A are encased in insulating material 50.

The material 50 may be foamed plastics material around which is located an external sheet material 52, for example stainless steel, defining an outer casing of the apparatus. Similar sheet material may be located over the material 50 on the door 22.

It will be appreciated that the coolant may take any suitable form such as freon or brine and instead of providing conduits the coolant may be passed through channels in the housing 14 and the door 22. Flexible conduit (not shown) is provided for connection to the door conduit 42 to enable the door to be opened and closed. Alternatively the door conduit 42 may be omitted.

It will be appreciated that the apparatus provides the facility for dispensing frozen product from pre-filled containers 15. After filling the containers take the form shown in FIG. 3 having the lid in place and secured to the body. At this time and during transport the outlet nozzle 25 is closed by a closure member 45 secured to the nozzle 25 by a tear-off strip 46. When the container 15 is to be located in the apparatus the closure member 45 is removed by release of the strip 46. Alternatively a screw top is provided.

The pneumatically operated piston arrangement described has several notable features. By using a receiver 20 for storing compressed air during non-operational periods a relatively small compressor 18 may be used. When dispensing of product is required beyond the capacity of the compressor, the receiver is the source of further supply. When a product container 15 is being changed and hence the cylinder no longer contains compressed air, the charge of compressed air into the cylinder at the commencement of discharge of a fresh container is relatively quick.

Referring now to FIGS. 4–7 of the drawings another embodiment of dispensing apparatus is shown in which the same reference numbers are used for similar parts to those of the previous embodiment.

Figure 4:
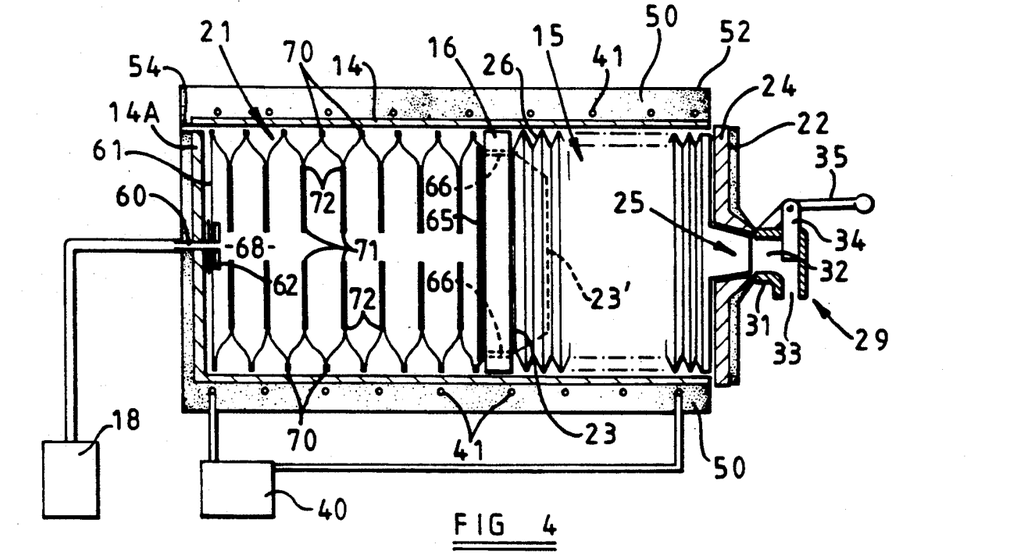
FIG. 4 is a side elevation, partly in section, of an alternative form of dispensing apparatus.

In this case the piston 16 is a relatively loose fit with the inner wall of the cylinder 14 for guidance only and is driven along the cylinder by compressed air from a compressor 18. The compressed air passes from the compressor into a bellows or extendable envelope 21.

The bellows 21 is located between the end wall 14A of the cylinder 14 and the piston 16 and is constructed so that upon pressurisation by air from the compressor the bellows 21 expands in the lengthwise direction of the cylinder and is urged against the piston 16. As shown in FIG. 4 the bellows is partially extended and the container 15 is partially compressed or deformed.

The bellows 21 is in the form of a concertina and at one end is attached to the piston 16 and at the other end the bellows engages the end wall 14A which acts as an abutment for the bellows.

The bellows 21 (as shown) is formed from a plurality of annular discs of plastics material which is relatively inextensible under the normal air pressures to be applied to the bellows and is impervious to air or other gas which may be used to pressurise the bellows. The plastics material may be fibre reinforced polyurethane sheet. One plastics end disc 61 (FIG. 4) carries an inlet air nozzle 60 which extends through a reinforced central part of the disc 61 and is attached to a flanged member 62. The nozzle 60 is releasably connected to the air compressor 18.

A plastics disc 64 at the opposite end of the bellows (FIG. 3) lies, in use, adjacent to piston 16 and the disc 64 carries an internal metal disc 65 from which extend pins 66 by which the end of the bellows 21 is attached to the piston 16, the pins 66 projecting through the disc 64 and the outer edge of the piston 16 and being secured by nuts. Alternatively a pair of interengaging catches on the disc 64 and the piston 16 may be provided.

The discs 67 between the end discs 61 and 64 each have a central opening 68 through which the air passes along the bellows and adjacent discs are welded to each other. The welding is arranged such that adjacent pairs of discs are welded to each other only around their outermost periphery at 70 and alternate pairs of discs are welded to each other around their central openings 68 at 71 the weld extending to the position 72.

In each case the welding 70, 71-72 extends wholly around the discs and the welded connection is made in an airtight manner to define a sealed envelope, access to which is made through the air nozzle 60 only.

Figure 5:
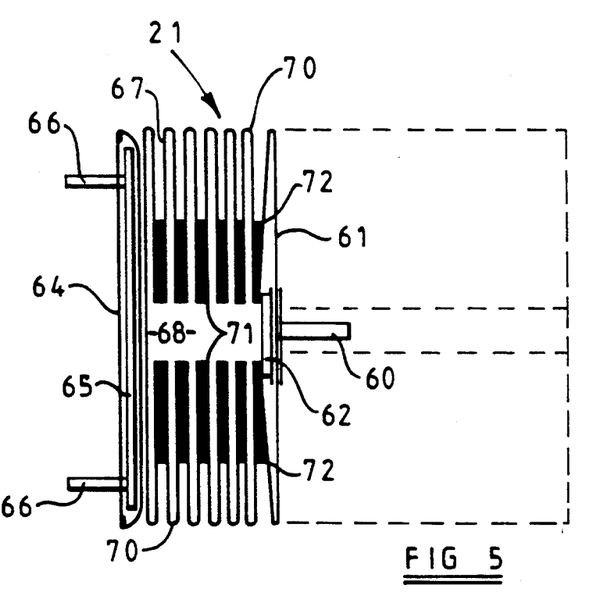
FIG. 5 is a side elevation of the bellows of FIG. 4.
Figures 6, 7:
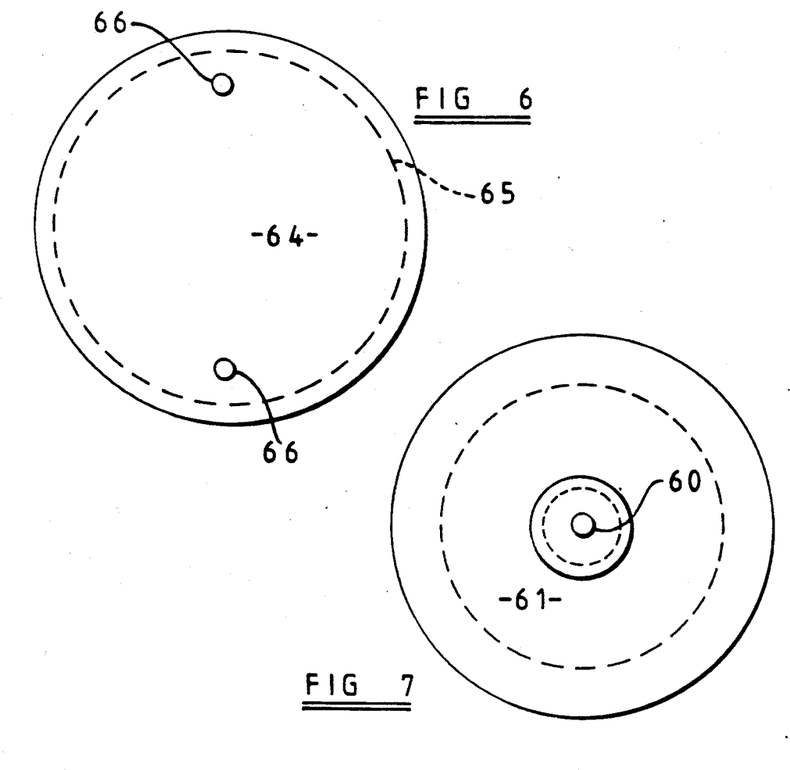
FIG. 6 is a view from one end of the bellows.
FIG. 7 is a view from the other end of the bellows.

In FIG. 5 the bellows is shown in its contracted position which it takes up when a full container 15 is located in the housing 14. In FIG. 4 the bellows 21 is shown partially extended as during the dispensing of product from the container 15. Radially arranged air channels (not shown) are formed on the inside surfaces of the discs 67 to ensure that the air can act on the spaces between the discs.

The bellows 21 described has a small minimum length and when extended it does not expand laterally to engage the walls of the cylinder despite a considerable amount of longitudinal extension being possible. However other forms of bellows 21 may be used.

As a modification to the illustrated bellows arrangement the bellows may be constructed to have a double wall thickness. An inner tube may be fitted inside the illustrated bellows and compressed air admitted to the inner tube to effect movement of the piston.

Upon the product container 15 being fully compressed and at its minimum internal size the bellows is at its maximum length and the piston 16 is at its extreme end position adjacent outlet 25 of the container 15.

By the use of an indirect supply of air pressure on the piston 16, the cylinder 14 and the piston 16 may be made of relatively inexpensive materials and the piston need not be other than a loose fit within the cylinder. Thus for example the cylinder 14 may be formed from steel or an aluminium or plastics extrusion. Similarly the piston may be of plastics.

If desired, to ensure against lateral expansion of the bellows 21 rigid rings may be secured around the bellows at the locations of the welding, i.e. at 70 or 72.

Compressed air is admitted to the bellows 21 from the compressor 18. Atmospheric air is free to enter and leave the space around the bellows through outlet 54 in the housing 14.

The container 15 is, in this embodiment, generally similar to that of the embodiment of FIGS. 1–3 except that the end wall 24 lies at a right-angle to the container axis and is integral with the body of the container. The door 22 conforms in its internal shape to the shape of the end wall 24 and at the centre of the door is located an opening shaped for receiving the tapered outlet nozzle 25.

At the end of a full stroke of the piston 16 in the cylinder 14 when the container 15 is fully compressed the air pressure in the bellows 21 is released. The door 22 is opened to gain access to the container 15 and the container, now empty, is removed from the cylinder 14.

Another full container is inserted into the cylinder and as this takes place the piston 16 is pushed back along the cylinder 14 to its start position and the bellows is compressed to its minimum length (FIG. 5). After full insertion of the full container the door 22 is closed and fixed in position.

Referring now to FIGS. 8, 9 and 10 there is shown an alternative form of door construction and mounting for the valve assembly 29.

In this case the door 22 is of one piece construction which may be a plastics moulding, the material being selected to have the necessary heat insulating properties. The door 22 has a central opening for receiving the outlet nozzle 25 and adjacent the opening is arranged a slide 80 for receiving the valve assembly 29.

The slide 80 defines spaced vertical slots which receive oppositely extending projections 81 on the sides of the assembly. The slide 80 includes a cross piece 82 against which the lower end of the assembly 29 is located in use.

The valve assembly 29 is located on the door 22 while the door is open, and, when the door is closed with a container 26 in the cylinder 14, the nozzle 25 of the container extends into the duct 32 at the rear side of the assembly 29. Referring again to FIG. 9, the nozzle 25 thus extends beyond the point at which the valve assembly 29 is engaged by the slide 80. As a result, the valve assembly 29 cannot be slidably removed from the door 22 due to the engagement with the nozzle 25. This ensures that the assembly 29 cannot be removed from the door when the door is in the closed position. In other respects the valve assembly is similar to the previously described arrangement. As seen in FIG. 10 the door is hinged at opposite sides, as at 85 and 86, to enable opening to either side.

The containers 15 may be filled with any kind of product by any kind of filling method, for example the product may be poured or otherwise placed in the container.

Containers for use in the apparatus may be stored in the base of the apparatus in a refrigerated compartment (not shown) or a refrigerated cylinder may be mounted on the apparatus to locate one or more containers end to end with doors at one or both ends.

Several apparatus may be located side by side or one above the other to provide a range of products, one kind of product in each apparatus, at the same location. Alternatively two or more housings may be located in a common unit.

The apparatus may dispense a wide range of product including product containing solids such as fruit and/or nuts. Dispensing of the product may be manual by operation of the lever 35 to open the discharge valve for the period required to discharge the desired sized portion of product. Alternatively the apparatus may be arranged to discharge a portion of predetermined size automatically.

The pneumatically operated arrangement described has several notable features. When a product container is being changed and hence the bellows no longer contains compressed air, the charge of compressed air in the bellows at the commencement of discharge of a fresh container is relatively quick.

Instead of the use of a compressor as a source of compressed air, the compressed gas may be supplied from another source such as a compressed gas container. Moreover instead of a refrigerator 40 cooling may be by use of expansion, and hence cooling, of a compressed gas supply, for example a nitrogen supply.

It will be appreciated that in order to dispense a wide range of product, including relatively hard ice cream, considerable pressure is required to be applied to the container 26. The apparatus can be used at air pressures of the order of 45 p.s.i. giving a pressure on the container of the order of one tonne. By the use of such pressures it has been found that the consistency of the discharged hard ice cream is improved.

By the use of the bellows arrangement safety of the apparatus is improved and any leakage of air from the bellows can be controlled within the cylinder envelope.

I claim:

1. A dispensing apparatus for dispensing a frozen product which comprises:
   deformable container means for containing a frozen product in semi-solid form to be dispensed, said container means having outlet means including an outlet opening in one end of said container means through which the product is discharged;
   drive means for deforming said container means whereby to discharge product in said container means through said outlet opening, said drive means being power operated and including:
   a plunger engageable with the opposite end of said container means to said outlet opening, and a source of pressurized gas for application to said plunger so that said plunger acts on said container means to deform said container means and discharge said product through said outlet opening;
   a housing for receiving said container means, said housing serving to releasably secure said container means during operation, said housing being formed at one end with a door container an opening through which said container outlet means extends, said door providing an abutment against which said container means is engaged during discharge and said door, when opened, providing access to said housing for replacement of said container means, said door carrying shut-off valve means for controlling discharge of product through said outlet means;
   said shut-off valve means includes duct means communicating sealingly at one end with said container outlet means and communicating at the other end with nozzle means through which the product is discharged under the control of said valve means, said shut-off valve means being releasable from said door means to permit cleaning of said shut-off valve means;
   said container outlet means being in engagement with said shut-off valve means whereby said frozen product flows directly from said container outlet means to said shut-off valve means and through said shut-off valve means upon actuation of said drive means and opening of said shut-off valve means, said container outlet means extending into said duct means and preventing release of said shut-off valve means from said door means when said door is closed; and
   refrigeration means whereby the container means is kept at a low temperature.

2. The apparatus according to claim 1 wherein said container means comprises opposed end walls and an intermediate deformable side wall, a first of said end walls being engageable by said plunger and a second, opposite end wall having said outlet means and being engageable with said housing acting as an abuttment, whereby upon operation of said drive means said container means is reduced in internal volume by deformation of said side wall to bring said one end wall towards said other end wall.

3. The apparatus according to claim 1 wherein said door is hingedly mounted on said housing and includes securing means for securing said door to said housing during discharge of product.

4. The apparatus according to claim 1 wherein said refrigeration means includes coolant passages located around said housing to cool said housing and said housing is enclosed by heat insulating means.

5. The apparatus according to claim 1 wherein said container means is of two part construction having one part comprising an end wall having the outlet means and the other part comprising a body which is secured to said one part after said container means is filled with product.

6. The apparatus according to claim 1 wherein said shut-off valve means and said door carry interengageable connecting means whereby a relative sliding movement said valve means is releasable from said door.

7. The apparatus according to claim 1 further comprising an expandable means located against said plunger, said pressurized gas being operable to expand said expandable means so that said expandable means acts on said plunger to deform said container means and discharge said product through said outlet opening.

8. The apparatus according to claim 7, wherein said expandable means comprises a bellows constructed of interconnected flexible annular discs, said annular discs being connected alternately at their inner and outer diameters.

9. The apparatus according to claim 8 wherein at said connections of said annular discs at their radially inner diameters said connections extend radially outwards towards said outer diameters.

* * * * *

UNITED STATES PATENT AND TRADEMARK OFFICE
CERTIFICATE OF CORRECTION

PATENT NO. : 5,150,820
DATED : Sep. 29, 1992
INVENTOR(S) : Shane R. McGill

It is certified that error appears in the above-identified patent and that said Letters Patent is hereby corrected as shown below:

Column 1, line 40, "pressurised" should read --pressurized--.

Column 1, line 47, "pressurised" should read --pressurized--.

Column 1, line 54, "pressurised" should read --pressurized--.

Column 3, line 14, "b" should read --by--.

Column 5, line 56, "pressurise" should read --pressurize--.

Signed and Sealed this

Ninth Day of November, 1993

Attest:

BRUCE LEHMAN

*Attesting Officer*   *Commissioner of Patents and Trademarks*